(12) United States Patent
Phoenix (10) Patent No.: US 10,473,094 B2
(45) Date of Patent: Nov. 12, 2019

(54) THERMAL MORPHING ANISOGRID STRUCTURE

(71) Applicant: The Government of the United States of America, as represented by the Secretary of the Navy, Arlington, VA (US)

(72) Inventor: Austin Phoenix, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 15/894,679

(22) Filed: Feb. 12, 2018

(65) Prior Publication Data

US 2018/0230975 A1    Aug. 16, 2018

Related U.S. Application Data

(60) Provisional application No. 62/457,529, filed on Feb. 10, 2017, provisional application No. 62/477,215, filed on Mar. 27, 2017.

(51) Int. Cl.
*F03G 7/06* (2006.01)
*G02B 26/00* (2006.01)

(52) U.S. Cl.
CPC ............. *F03G 7/065* (2013.01); *G02B 26/00* (2013.01)

(58) Field of Classification Search
CPC .............................. F03G 7/065; G02B 26/00
USPC .................................................. 60/526–528
See application file for complete search history.

(56) References Cited

U.S. PATENT DOCUMENTS

| | | | | |
|---|---|---|---|---|
| 5,727,391 A | * | 3/1998 | Hayward | B25J 9/1085 248/636 |
| 6,016,845 A | * | 1/2000 | Quigley | D04C 1/06 138/125 |
| 8,245,799 B2 | * | 8/2012 | Chiel | F03G 7/00 180/7.1 |
| 8,339,842 B2 | * | 12/2012 | Boutchich | G11C 7/04 365/148 |
| 2006/0116716 A1 | * | 6/2006 | Gerberding | A61B 17/12022 606/200 |

(Continued)

OTHER PUBLICATIONS

High Precision Thermal Morphing of the Smart Anisogrid Structure for Space-Based Applications. to Austin A. Phoenix (Aug. 2016) (Year: 2016).*

*Primary Examiner* — Mark A Laurenzi
*Assistant Examiner* — Shafiq Mian
(74) *Attorney, Agent, or Firm* — US Naval Research Laboratory; Richard F. Bis (57) ABSTRACT

A thermally-controlled actuator includes a cylindrical anisogrid structure formed from a plurality of circumferentially offset clockwise and counter-clockwise helical members, and a plurality of longitudinally offset cylindrical ring members. A thermal control element is configured to control the temperature of at least some of the members. The cylindrical anisogrid structure has a top interface constraint and a bottom interface constraint, and the thermal control element is configured to control a displacement of the top interface constraint relative to the bottom interface constraint via control of the temperature of at least one of the helical members.

13 Claims, 6 Drawing Sheets

(6 of 6 Drawing Sheet(s) Filed in Color)

(56) References Cited

U.S. PATENT DOCUMENTS

| | | | |
|---|---|---|---|
| 2011/0083325 A1* | 4/2011 | Foley | B21F 35/00 29/896.9 |
| 2012/0094041 A1* | 4/2012 | Parfrey | B29C 70/222 428/34.1 |
| 2015/0040753 A1* | 2/2015 | Bishop-Moser | F15B 15/10 92/254 |
| 2017/0066519 A1* | 3/2017 | Mabe | B32B 15/01 |

* cited by examiner

FIG. 6

THERMAL MORPHING ANISOGRID STRUCTURE

RELATED APPLICATIONS

This application claims the benefit of U.S. Provisional Application No. 62/457,529 filed Feb. 10, 2017, and U.S. Provisional Application No. 62/477,215 filed Mar. 27, 2017, which are each hereby incorporated herein by reference.

FIELD OF INVENTION

The present invention relates generally to thermally-controlled actuators, and more particularly to thermal morphing constrained structures such as the anisogrid.

BACKGROUND

Conventional structural paradigms consist of a heavy and rigid primary structure coupled with a secondary morphing system to achieve the displacement control required for high precision applications. These rigid primary structures are required to be very heavy. Terrestrially, sparse apertures, such as the Navy Precision Optical Interferometer (NPOI), exist. The NPOI uses six telescopes, mounted to bedrock, placed along three 250 meter arms joining the light to create a single image with much higher resolution than is capable to achieve using any of the six individual telescopes. A key problem is phasing the photons from each individual telescope back together to create an effective single optical surface. This is done using fine and course actuators to ensure that the distance the light travels from each individual optical mirror assembly to the optical sensor is the same. The sparsity of this system is less than 1% but it has produced the highest resolution optical images of any astronomical instrument to date. Replicating this system in orbit to create a large coherent mirror is difficult. The methodology used to date with James Web Telescope and others consists of a heavy structure used as the rigid and invariant foundation for the coarse and fine actuation control to deliver the displacement accuracy required. The development of this thermally stable extremely stiff primary structure introduces significant mass requirements that increase the cost of the system.

Lower accuracy smart morphing systems such as hexapod morphing systems (Stewart platforms) have been implemented with success. The hexapod has been shown to be a versatile simple morphing system able to provide low accuracy morphing systems. The conventional hexapod is reliant on classical actuators to act as both the structural connection and the actuation method. The conventional actuators used in hexapods are not able to provide sufficient control capability to achieve the high precision morphing capability. Furthermore having the actuator as the primary load path reduces the stiffness of the system relative to the invention reducing structural performance. The hexapod is also not structurally efficient and has some dynamic complexities due to the kinematic nature of the design.

As the quest for higher resolution telescopes drive the size of optical apertures larger and larger the structural methodology needs to adapt to meet these challenges. Conventional systems, with a single solid primary (monolithic) mirror, are limited by spacecraft volume and mass as well as the exponential scaling of mirror manufacturing costs. Monolithic mirror technology, like the Hubble Telescope, is already at the limit of financial feasibility and to achieve more operational capability new geometries and technologies must be investigated. Sparse aperture optical systems can be made cost effective by using several smaller and therefore much lower cost mirrors that are phased together creating an effectively much larger mirror using a complex structural and secondary optical system. Segmented mirror telescopes like JWST have achieved phasing on the scales of IR but the ability to achieve phasing for sparse apertures in the optical range, at low cost, would enable missions that are impossible today.

SUMMARY OF INVENTION

Therefore, described herein is a novel morphing smart structure that is applicable to a wide range of smart structural applications from large space structures with large displacement control requirements to the next generation of sparse aperture optics with small displacement requirements and nanometer precision requirements. This is possible through the use of a system that consists of a large number of independent members that are connected together in such a way that as a single member actuates (grows) the other members resist that deformation resulting in a reduced output for the given input. The introduction of adaptive, or morphing, capabilities to address the system requirements relaxes the structural stiffness requirements resulting in significant mass savings. This mass saving provides significant cost savings and enables new mission architectures. Exemplary embodiments expand the capability of current adaptive and passive structures, in order to build smart structure systems that meet the design requirements by actively adapting to the changing environment. Conventional structural paradigms achieve static displacement, thermal distortion stability, and dynamic design requirements through the application of stiff, thermally invariant, heavy primary structures with secondary adaptive systems. Exemplary embodiments are mass-efficient, integrated, and active structures that can provide low-frequency vibration isolation and thermal distortion corrective control, while also meeting high-precision alignment and position control requirements. This morphing capability can be used to correct on-orbit alignment, manufacturing error, seasonal variations, and structural, or thermal distortion.

According to one aspect of the invention, a thermally-controlled actuator includes a cylindrical anisogrid structure formed from a plurality of circumferentially offset clockwise helical members having a clockwise helical pitch angle, a plurality of circumferentially offset counter-clockwise helical members having a counter-clockwise helical pitch angle, and a plurality of longitudinally offset cylindrical ring members; and a thermal control element configured to control the temperature of at least one of the clockwise helical members and at least one of the counter-clockwise helical members. The cylindrical anisogrid structure has a top interface constraint and a bottom interface constraint, and the thermal control element is configured to control a displacement of the top interface constraint relative to the bottom interface constraint via control of the temperature of at least one of the at least one clockwise helical member or the at least one counter-clockwise helical members.

Optionally, the thermal control element is configured to control a displacement of the top interface constraint relative to the bottom interface constraint via control of the temperature of the at least one clockwise helical member and the at least one counter-clockwise helical members.

Optionally, the clockwise helical members are thermally isolated from the counter-clockwise helical members.

Optionally, the clockwise helical members are locally radially offset from the counter-clockwise helical members.

Optionally, the clockwise helical members are radially offset from the counter-clockwise helical members all along a circumference of the structure.

Optionally, the clockwise helical members are mechanically coupled to the counter-clockwise helical members by beams radially extending between clockwise helical members and counter-clockwise helical members at locations of axial and tangential cross-over.

Optionally, the thermal control element is configured to selectively increase temperature of a first clockwise helical member and a first counter-clockwise helical member by a minimum controllable amount, and to simultaneously decrease the temperature of a second clockwise helical member and an a second counter-clockwise helical member by the minimum controllable amount, thereby causing a minimum amount of displacement between the top interface constraint and the bottom interface constraint.

Optionally, the thermally-controlled actuator includes an optical element coupled to the top interface constraint.

Optionally, the thermally-controlled actuator includes a second cylindrical anisogrid structure coupled to the top interface constraint at a bottom interface constraint of the second cylindrical anisogrid structure, wherein the second cylindrical anisogrid structure has a displacement capability one or more orders of magnitude different from a displacement capability of the first cylindrical anisogrid structure, and the thermal control element is configured to collectively control the first and second cylindrical anisogrid structures to produce a total relative displacement between the bottom interface constraint of the first cylindrical anisogrid structure and a top interface constraint of the second cylindrical anisogrid structure.

Optionally, the thermal control element includes at least one thermoelectric device at the bottom interface constraint.

Optionally, the thermal control element includes a conductor running through the at least one clockwise helical member and the at least one counter-clockwise helical member.

Optionally, the thermal control element is configured to control the temperature of the at least one of the at least one clockwise helical member or the at least one counter-clockwise helical members by passively cooling the at least one member by ceasing to maintain the temperature of the at least one member at a level higher than ambient.

According to another aspect of the invention, a thermally-controlled actuator includes a lattice structure formed from a plurality of independent structural members having a single coefficient of thermal expansion, wherein the structural members are connected together in such a way that as any single structural member actuates via thermal change, a remainder of the structural members resist deformation of the lattice structure as a whole, resulting in a reduced output for a given input; and a thermal control element configured to control temperature of at least one structural member. The plurality of structural members are thermally isolated from each other. The structure has a top interface constraint and a bottom interface constraint, and the thermal control element is configured to control a displacement of the top interface constraint relative to the bottom interface constraint via control of the temperature of the at least one structural member.

The foregoing and other features of the invention are hereinafter described in greater detail with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
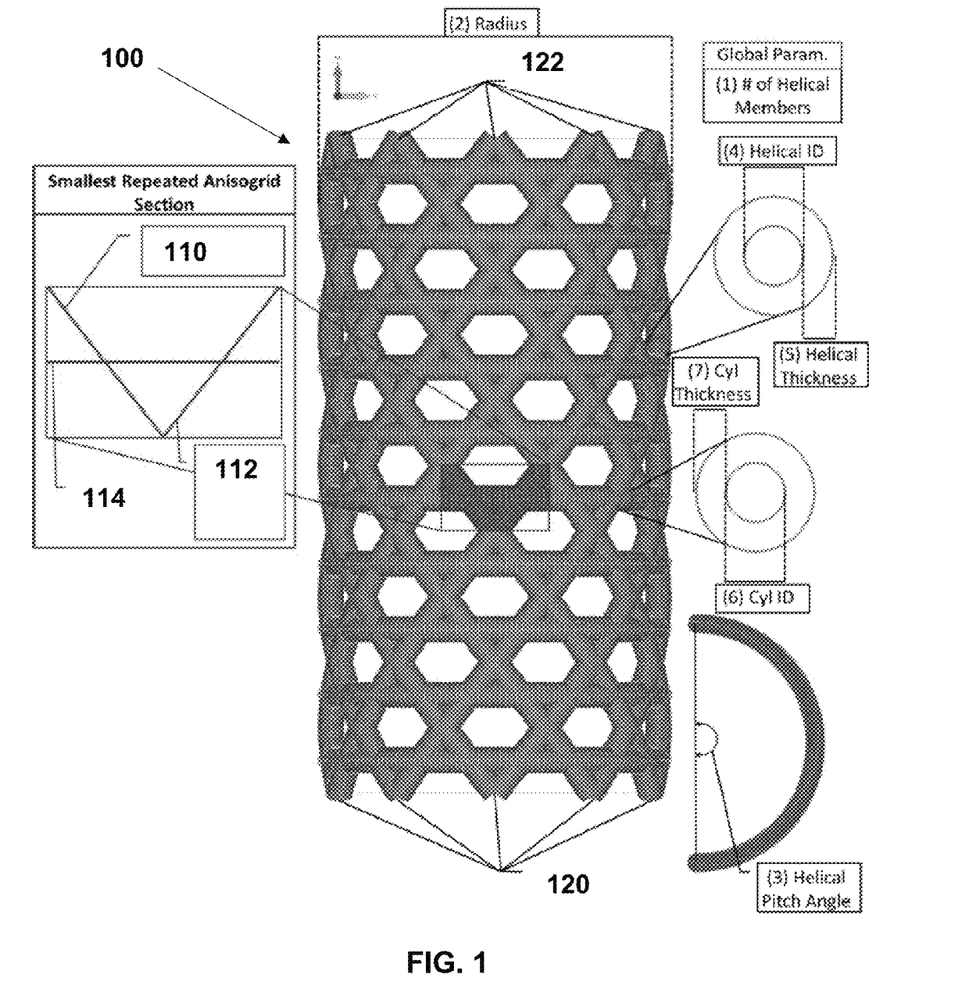
FIG. 1 shows anisogrid geometry with all nine geometric parameters of interest and the smallest repeated anisogrid section shown in detail.

Exemplary thermal morphing anisogrids, illustrated in FIG. 1, may replace conventional structural paradigms, which consist of a heavy and rigid primary structure coupled with a secondary morphing system by using smart adaptive primary structure. This is achieved by integrating the adaptive capability directly into the primary structure. The adaptive structural concept achieves design requirements by predicting and adapting to thermal and structural loading environments in real time. This adaptive capability is achieved through the use of thermal strain as the active actuation mechanism to control the lengths of helical members in the anisogrid structure. To morph to the desired position, thermal energy is applied to the helical members in the system to generate axial expansion due to local and global thermal strains, which pushes and pulls the system into the desired configuration. The application of thermal loads can be seen in FIGS. 2-4. While thermal strains have been proposed before, exemplary structures and control methods are the first to use a thermal strain to actuate a macro system on the micro and nano scales. This is achieved by using a highly constrained system such that, an actuator outside of the system that would displace 1 unit would, once integrated into the system, cause displacement of the system much less than 1 unit due to the rest of the structure resisting its movement. Exemplary anisogrid structure uses each helical member as an active actuator to provide a multi-directional thermal strain vector in a constrained structure. By introducing structural coupling and a multi-directional thermal strain, the system can produce smaller displacements per applied thermal strain. While the introduction of structural coupling improves the structural control capability, it also introduces thermal coupling. In the intended space-based environment, standard radiation shielding and the absence of an atmosphere removes the radiation and convective coupling thermal losses. The conductive coupling that occurs at helical interface locations can be mediated through the material or structural choices that limit the conduction at those interfaces. High precision morphing is created through the use of low coefficient of thermal expansion (CTE) materials and precisely controlled applied temperatures. High displacement morphing is created through the use of high CTE materials or shape memory alloys and precisely controlled applied temperatures. The combination of multiple materials could enable a single structure to provide macro, micro and nano morphing control. To achieve this, three sections of the system could be built: one with a high CTE material or shape memory material, a material with a CTE in the middle of the possible range, and an extremely low CTE material. Each of these sections could be actuated separately to provide large displacement capability with high precision morphing accuracy in the same low mass structure.

This structure takes advantage of a distributed actuation force that reduces global deformation through the dissipation of strain energy in local deformations. A significantly reduced morphing displacement relative to the length of the input actuation can be achieved by this method.

Looking first at FIG. 1, the geometrically complex tubular anisogrid structure 100 has recently become more viable due to improvements in manufacturing capabilities and has shown great promise in structural applications where a lightweight structure is of critical importance. The anisogrid structure 100 is made up of three structural components, the clockwise helical tubular members 110, the counterclockwise helical tubular members 112, and the circumferential tubular members 114, as seen in FIG. 1. The structure begins at a base or bottom interface constraint 120 and ends in a top interface constraint 122. The anisogrid has four buckling failure modes: global buckling, global wall buckling, local tube buckling, and local tube wall buckling. For structural applications, the overall geometry, including the helical and cylindrical cross sections, may be sized to achieve optimally reduced mass by ensuring all buckling failure load cases occur at the same input load.

Figure 2:
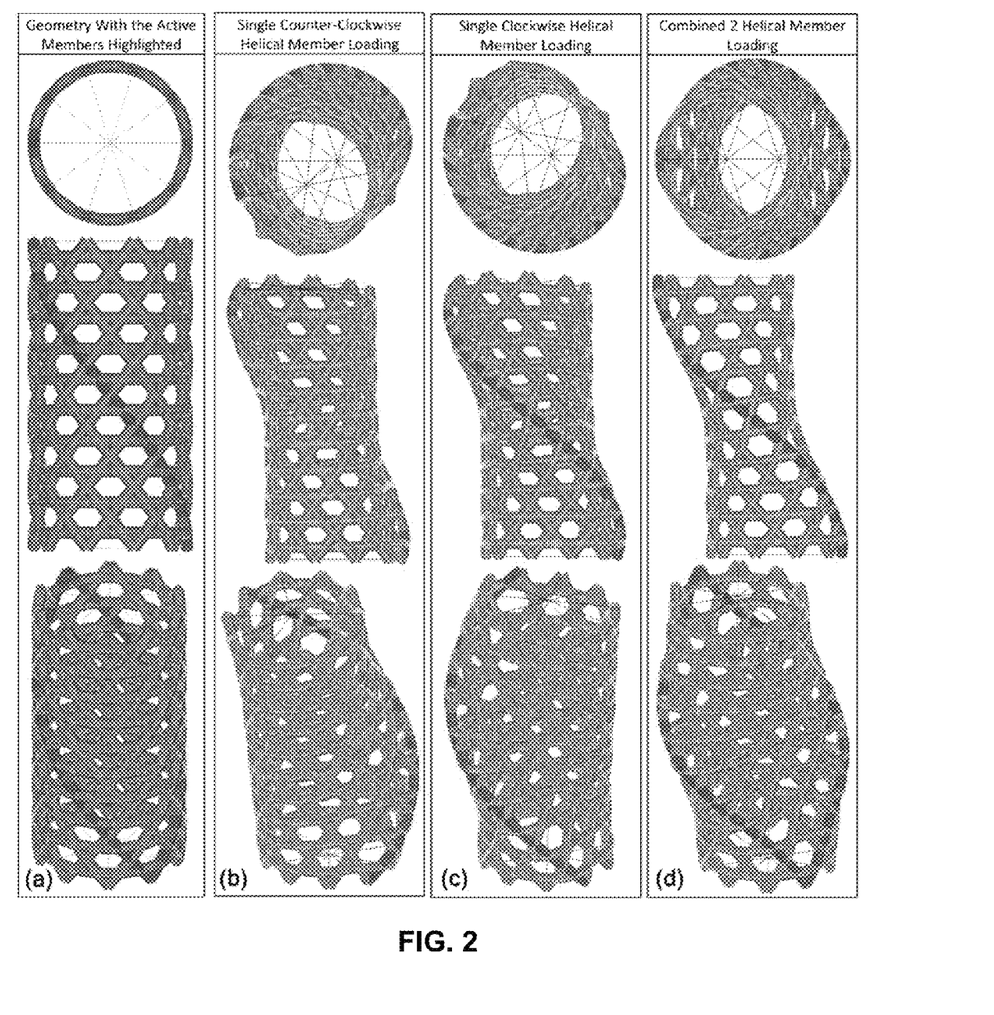
FIG. 2 shows finite element model response to three loading cases with the heated elements shown in red. (a) unloaded geometry (b) single counter clockwise helical loading, (c) single clockwise helical loading, (d) a symmetric combination of clockwise and counter clockwise helical loading.

The clockwise and counter-clockwise helical loadings, as seen in FIG. 2 (a) and (b), have symmetric displacement vectors. Two displacement vectors with components in all six DOF can be combined to generate a displacement in only the X and Z axis, as seen in FIG. 2(c). Additional local and global thermal gradients can be added to produce a 6 Degree of Freedom (DOF) actuator.

Figure 3:
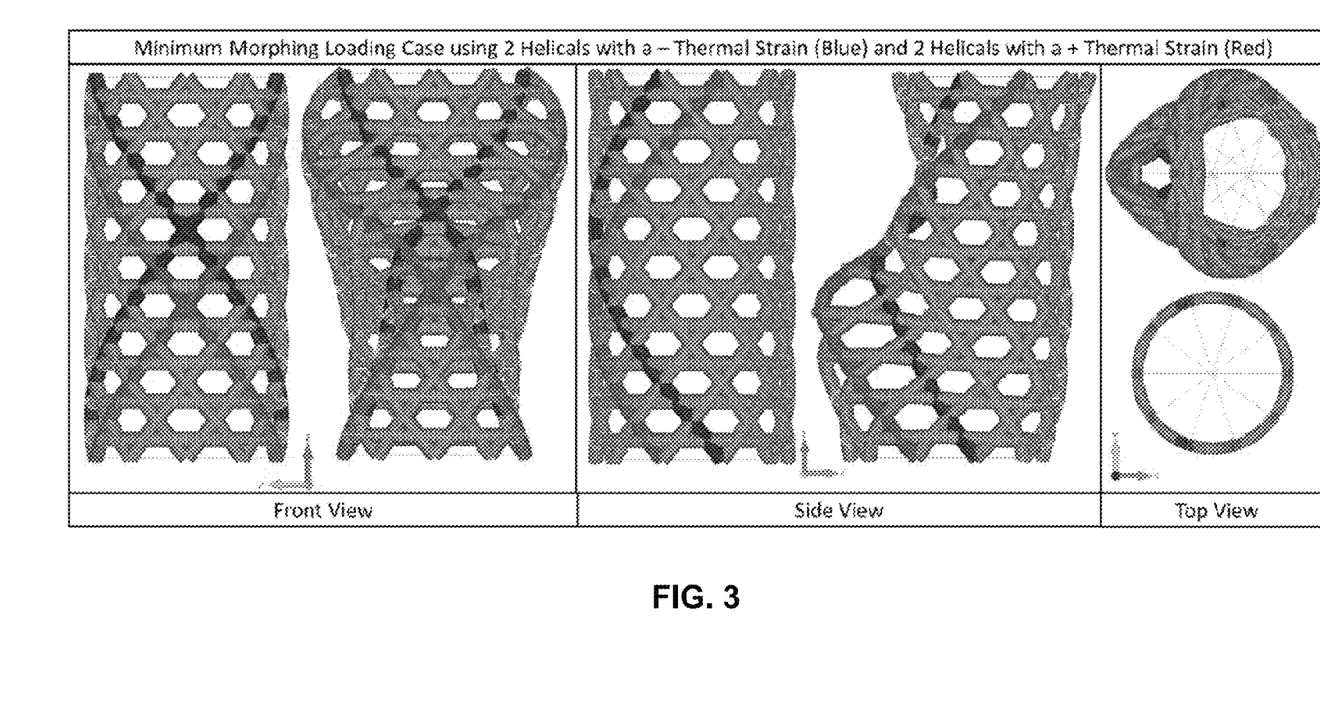
FIG. 3 shows a visualization of the loaded helical members and the resulting x-axis minimum in-plane displacement capability for the nominal geometry.
Figure 4:
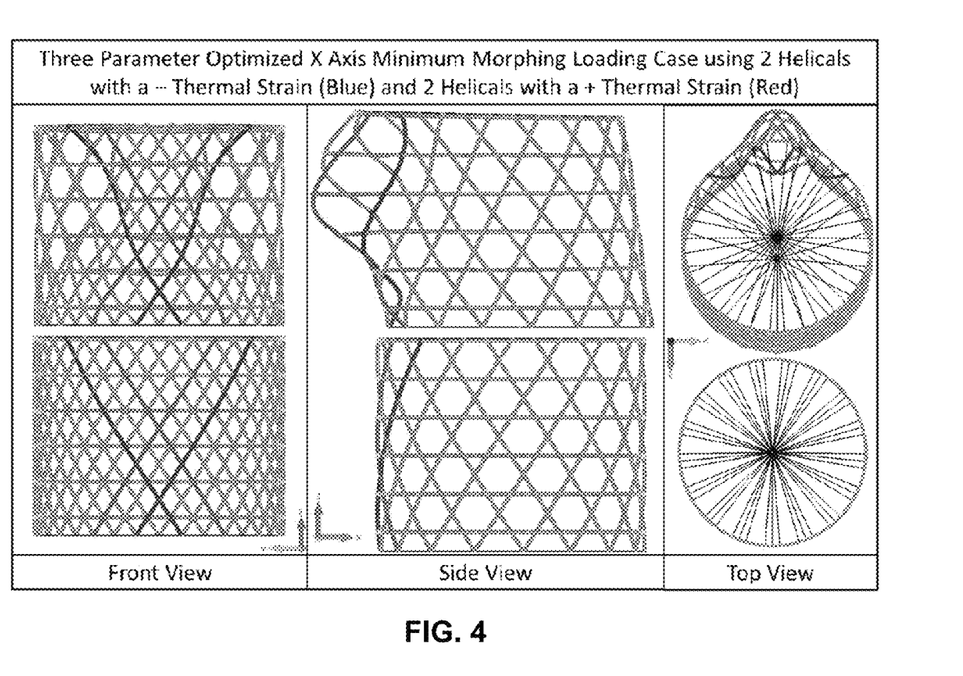
FIG. 4 shows minimum x-axis morphing control case with a positive strain applied to helical 15, and 22, and a negative strain applied to helical 17 and 20.

Turning to FIG. 3, shows is an example of the minimum morphing control case in the X axis, where two helical members are loaded with a positive thermal strain (shown in red) and two members loaded with a negative thermal strain (shown in blue). This configuration demonstrates the precision capability of the actuator given 4 independent control authority.

The use of a normalized unit input loading, allows scaling of the workspace and minimum displacement results to evaluate systems with a variety of material choices, displacement control goals, and thermal control requirements. The method to scale the original unit thermal strain and to calculate the properties of a specific material and thermal control capability is detailed in Equation 1 through Equation 3. The classically applied thermal strain calculation can be seen in Equation 1 as, $$\varepsilon = \alpha \Delta T, \quad (1)$$

where $\varepsilon$ is the resulting thermal strain (m/m), $\alpha$ is the material CTE (m/m/° C.), and $\Delta T$ is the thermal control capability (° C.). For the development of the model $\alpha=1$ m/m/° C. and $\Delta T=1$° C. resulting in a thermal strain of 1 m/m. To calculate the required thermal strain needed to achieve a specific displacement, the output of a finite element analysis (FEM) may be scaled. Once the required thermal strain is known, the required material and thermal control capability can be calculated.

$$\frac{D_{FEM}}{\varepsilon_{input}} = \frac{D_{desired}}{\varepsilon_{required}} = \frac{D_{desired}}{\alpha \Delta T}, \quad (2)$$

where $D_{FEM}$ (m) is the FEM output from a unit $\varepsilon_{input}=1$ m/m, the desired output is $D_{desired}$ (m) and the required material and control properties are $\alpha$ (m/m/° C.) and $\Delta T$(° C.). For a given thermal control capability, the resulting equation can be rearranged to produce a relationship between the desired morphing control, and the required thermal control for a given material as, $$\Delta T = \frac{D_{desired} \varepsilon_{input}}{D_{FEM} \alpha} \quad (3)$$

Using the FEM output, $D_{FEM}$, the other properties of the system can be evaluated. The first investigation is into the thermal control as a function of material CTE for a given displacement goal of 1 μm.

Low CTE carbon composite, invar, and aluminum are three materials that represent the overall CTE range. The three materials can achieve 1 μm displacement control in all six degrees of freedom, through the use of a thermal control system with an accuracy of, 20° C., 2° C., and 0.1° C., respectively.

To actuate the system the control system may provide individual helicals with a $\Delta T$(° C.) relative to the rest of the system. The helical members can be heated and cooled actively using integrated elements along the length of the helical members or at boundary locations. For example, structural members may be electrically heated via direct application of current or via indirect application of current to an embedded or adjacent conductor, or via induction heating. Passive control can be achieved by using a thermal bias where the whole system is hot or cold relative to the environment. This passive control enables the cooling of the system by simply not heating the system. Moreover, a passive system could be designed to change shape to automatically compensate for changes of shape in adjacent structures (the rest of a satellite, e.g.,) when the entire system is subjected to expected thermal changes (e.g., being exposed to sunlight or shade conditions).

Looking now at the nine parameters in FIG. 1, each of these parameters has an effect on global stiffness.

An increase in the number of helical members is expected to increase the system stiffness through not only the greater number of helical members, but also through an increase in the number of cylindrical ring members required to maintain anisogrid hexagonal pattern. These factors result in an exponential growth in overall stiffness.

The pitch angle affects multiple components in the morphing evaluation. Firstly, the pitch angle has a coupled stiffness effect between the axial, circumferential, and bending stiffness. Secondly, the pitch angle dictates the angle of the thermal strain vector. Finally, the pitch angle affects the length of the helical member resulting in control over the overall thermal strain applied to the system.

As the radius increases, the total bending stiffness increases; but, an important secondary effect is the change in the effective thermal strain direction by changing the circumferential travel distance of the helical.

The impact of the helical cross-section inputs, as well as the cylindrical cross section, have local and global effects. The overall helical and cylindrical stiffness has an impact on the total stiffness and the axial stiffness of the helical member. This dictates the effective actuation force provided by the applied thermal strain and the effective global stiffness acting against that actuation force.

Overall, it is noted that investigations have shown that a five order of magnitude overall displacement length difference can be seen within the design space of these nine parameters. This is indicative that this geometry can solve a wide variety of morphing problems. Further, it is noted that the parameters of 1) number of helical members, 2) the radius, and 3) the pitch angle have the most significant effect on the system's performance. A preferred embodiment for a 1 meter long boom includes 34 helical members, a radius of 0.625 m, and a helical pitch angle of 1.03 radians.

A performance metric to be evaluated is the frequency response capability of this system as a function of the available power. The specific heat capacity for the material is multiplied by the volume of a given active member and by the temperature change in ° C. to calculate the total energy required. In the case of minimum displacement illustrated in FIG. 3, the minimum morphing case contains four active helical members actuated by 1° C. The total energy to heat the four members by 1° C. is used to calculate the power and frequency response capability for the two materials and three geometric configurations. The key driver in the frequency response capability is the helical mass, which depends highly on helical cross-section. The preferred embodiment, described above, can deliver 1 Hz frequency response capability using 6 kW.

An exemplary thermal morphing anisogrid high precision morphing boom can provide high precision displacement control in the space environment. The thermal morphing anisogrid structure has been demonstrated to be a potential replacement for the current structural highly precise paradigm as well as other adaptive structural applications. This system can provide the same capability at a lower mass and enable new mission architectures. Although there are examples of thermal strain being used on smaller scales in conventional systems, there are no known discussions of the use of thermal strain to actuate a macro system without the use of bi-metal actuation or other CTE mismatch characteristics. The structural configuration constrains the input actuation and distributes that input load through the structure reducing the output displacement. This increases the morphing accuracy through reduction in the output. The anisogrid structure has not been used for morphing applications to date.

Exemplary constrained thermal morphing systems can be implemented in a 2D configuration to implement a thermal morphing mesh system. This structure would optimize the local and global stiffness characteristics to introduce passive or active morphing characteristics that provide the same thermal or structural positional stability that is achieved using a large number of actuators today. This system relies on the same structural constraint to distribute the distortion energy around the structure to achieve the high precision morphing capability. To achieve this structural constraint similar with the anisogrid boom, the addition of an outer ring to counteract internal displacements would provide additional control capability. Another exemplary embodiment includes an internal cable that resists deformation of the system via tension. Such a cable (or system of cables) could run along a longitudinal axis of a structure, across a diameter of the structure, or at an angle connecting any two points of the structure. These modifications would result in further reduction of the output displacement for a given input actuation strain due to the distribution of that strain energy within the structure.

Exemplary mesh (2D Anisogrid systems) thermal morphing systems could also be used passively to provide a larger range of operational stability to a controlled surface by counteracting the thermal distortions of the controlled system.

The nominal anisogrid structural design uses simple intersections that are prone to introduce thermal losses. An exemplary embodiment that utilizes intelligent interface design could drastically reduce the thermal loss from one member to the rest of the system. To achieve this effect, each member intersection would specifically be designed to provide a low contact area thermal connection while still providing the required structural interface. This could be done by maximizing the moment of inertia of the contact area while minimizing the contact area. These competing factors would be used to define the final optimal interface for a specific design point.

Figure 5:
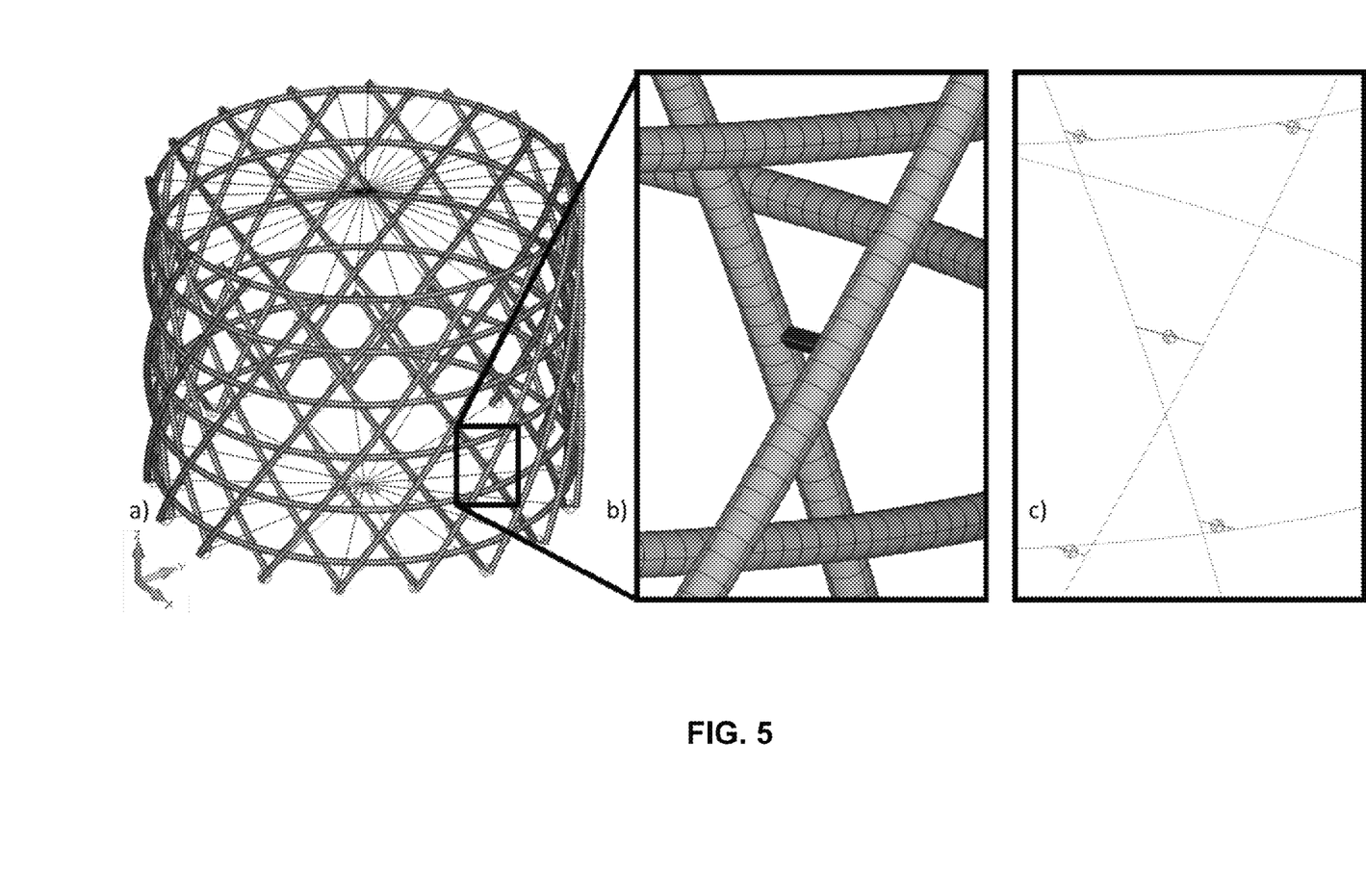
FIG. 5 shows an exemplary design of thermal interface with separate elements used for conductive runs and stiffness runs.
Figure 6:
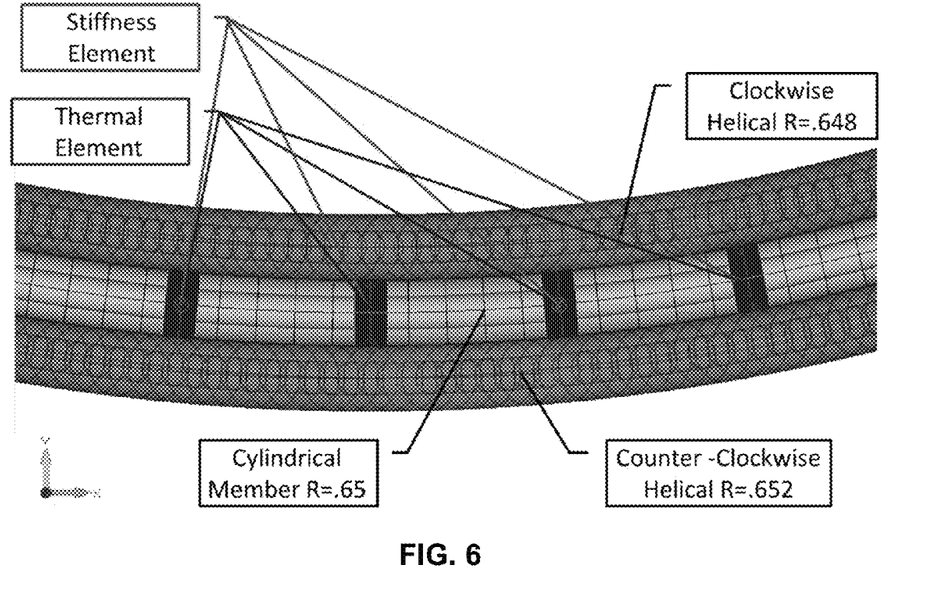
FIG. 6 shows an exemplary demonstration of inner clockwise helicals, outer counter-clockwise helicals, and the thermal and structural elements that are used to connect the individual members.

In particular, to design the interface intelligently the anisogrid structure is designed slightly differently than other exemplary embodiments (although these features may be combined where appropriate) with clockwise inner helicals, counter clockwise outer helicals, and cylindrical ring members, shown in FIGS. 5 and 6. This allows for the design of an interface structure allowing for control of interface stiffness and thermal conductivity. This could also be achieved through locally changing the helical radius only at interface locations such that a similar interface structure can be used without a global radius change of the structure. It would also be possible to select materials with anisotropic thermal conductivity properties to deliver the same thermal and structural isolation without the introduction of the complex interfaces through material property selection or clever design choices.

An exemplary variation of the preferred embodiment described above that incorporates this thermal isolation may have a radius of the inner clockwise helical members set to R=0.648 m, the cylindrical ring members set to R=0.65 m, and the counterclockwise helical members set to R=0.652 m, for example. In this case, cylindrical ring members may be connected to helical members with an isolator beam having a length of 2 cm (for example). Inner and outer helical members may be connected with an isolator beam length of 4 cm (for example).

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A thermally-controlled actuator comprising:
a cylindrical anisogrid structure formed from a plurality of circumferentially offset clockwise helical members having a clockwise helical pitch angle, a plurality of circumferentially offset counter-clockwise helical members having a counter-clockwise helical pitch angle, and a plurality of longitudinally offset cylindrical ring members; and
a thermal control element configured to control the temperature of at least one of the clockwise helical members and at least one of the counter-clockwise helical members,
wherein the cylindrical anisogrid structure has a top interface constraint and a bottom interface constraint, and
wherein the thermal control element is configured to control a displacement of the top interface constraint relative to the bottom interface constraint via control of the temperature of at least one of the at least one clockwise helical member or the at least one counter-clockwise helical members.

2. The thermally-controlled actuator of claim 1, wherein the thermal control element is configured to control a displacement of the top interface constraint relative to the bottom interface constraint via control of the temperature of the at least one clockwise helical member and the at least one counter-clockwise helical members.

3. The thermally-controlled actuator of claim 1, wherein the clockwise helical members are thermally isolated from the counter-clockwise helical members.

4. The thermally-controlled actuator of claim 1, wherein the clockwise helical members are locally radially offset from the counter-clockwise helical members.

5. The thermally-controlled actuator of claim 4, wherein the clockwise helical members are radially offset from the counter-clockwise helical members all along a circumference of the structure.

6. The thermally-controlled actuator of claim 4, wherein the clockwise helical members are mechanically coupled to the counter-clockwise helical members by beams radially extending between clockwise helical members and counter-clockwise helical members at locations of axial and tangential cross-over.

7. The thermally-controlled actuator of claim 1, wherein the thermal control element is configured to selectively increase temperature of a first clockwise helical member and a first counter-clockwise helical member by a minimum controllable amount, and to simultaneously decrease the temperature of a second clockwise helical member and an a second counter-clockwise helical member by the minimum controllable amount, thereby causing a minimum amount of displacement between the top interface constraint and the bottom interface constraint.

8. The thermally-controlled actuator of claim 1, further comprising an optical element coupled to the top interface constraint.

9. The thermally-controlled actuator of claim 1, further comprising a second cylindrical anisogrid structure coupled to the top interface constraint at a bottom interface constraint of the second cylindrical anisogrid structure, wherein the second cylindrical anisogrid structure has a displacement capability one or more orders of magnitude different from a displacement capability of the first cylindrical anisogrid structure, and
wherein the thermal control element is configured to collectively control the first and second cylindrical anisogrid structures to produce a total relative displacement between the bottom interface constraint of the first cylindrical anisogrid structure and a top interface constraint of the second cylindrical anisogrid structure.

10. The thermally-controlled actuator of claim 1, wherein the thermal control element includes at least one thermoelectric device at the bottom interface constraint.

11. The thermally-controlled actuator of claim 1, wherein the thermal control element includes a conductor running through the at least one clockwise helical member and the at least one counter-clockwise helical member.

12. The thermally-controlled actuator of claim 1, wherein the thermal control element is configured to control the temperature of the at least one of the at least one clockwise helical member or the at least one counter-clockwise helical members by passively cooling the at least one member by ceasing to maintain the temperature of the at least one member at a level higher than ambient.

13. A thermally-controlled actuator comprising:
a lattice structure formed from a plurality of independent structural members having a single coefficient of thermal expansion, wherein the structural members are connected together in such a way that as any single structural member actuates via thermal change, a remainder of the structural members resist deformation of the lattice structure as a whole, resulting in a reduced output for a given input; and
a thermal control element configured to control temperature of at least one structural member,
wherein the plurality of structural members are thermally isolated from each other,
wherein the structure has a top interface constraint and a bottom interface constraint, and
wherein the thermal control element is configured to control a displacement of the top interface constraint relative to the bottom interface constraint via control of the temperature of the at least one structural member.

* * * * *